United States Patent [19]

Lambert

[11] 4,342,654

[45] Aug. 3, 1982

[54] PULSATION AMPLITUDE CONTROL FOR PNEUMATICALLY PULSATED LIQUID

[75] Inventor: Jean-Luc Lambert, Fontainebleau, France

[73] Assignee: Fives-Cail Babcock, Paris, France

[21] Appl. No.: 275,875

[22] Filed: Jun. 22, 1981

[30] Foreign Application Priority Data

Jun. 25, 1980 [FR] France ................................ 80 14080

[51] Int. Cl.[3] ................................................ B01D 21/24

[52] U.S. Cl. ..................................... 210/744; 210/800; 210/120; 210/221.2; 209/170; 209/173

[58] Field of Search ............... 210/740, 744, 800, 808, 210/961, 113, 120, 141, 143, 221.2; 209/17-20, 159, 14 164, 170, 173

[56] References Cited

U.S. PATENT DOCUMENTS 3,479,281 11/1969 Kikindal et al. ................ 209/170 X
3,822,015 7/1974 Hsieh et al. .................. 210/221.2 X
4,120,783 10/1978 Baummer .............................. 209/18
4,226,714 10/1980 Furness et al. ................ 210/740 X

*Primary Examiner*—John Adee
*Attorney, Agent, or Firm*—Kurt Kelman

[57] ABSTRACT

The invention concerns the separation of granular products of different density in a pneumatically pulsated liquid medium. To control the pulsation amplitude, the level of separation of two layers of the product is detected by a sensor which emits a corresponding control signal and the pulsating air is intermittently vented. The beginning of the venting is controlled after the air inlet valve has been opened completely, the termination of the air venting is controlled at the same time as the closing of the air inlet valve, and the duration of the venting is determined by the control signal from the level sensor. This signal is transmitted to a first input of a computer receiving the control signal and a second input receiving the output signal from a memory unit wherein the air inlet valve opening and closing program is stored, and the output signal of the computer controls the venting.

8 Claims, 8 Drawing Figures

PULSATION AMPLITUDE CONTROL FOR PNEUMATICALLY PULSATED LIQUID

The present invention relates to the separation of granular products of different density into two separate layers in a liquid medium contained in a tank wherein the liquid is pneumatically pulsated, and more particularly to the pulsation amplitude control for the pneumatically pulsated liquid.

Tanks of this type generally comprise a pulsation chamber filled with the liquid, a separation chamber, a perforated bottom for the separation chamber between the chambers and immersed in the liquid, the pulsation and separating chambers being in communication through the perforated bottom, an air chamber in communication with the pulsation chamber, and an air inlet element for intermittently delivering compressed air into the air chamber. A bed of the granular product to be separated floats in the separation chamber above the perforated bottom and the product is separated by the pulsating liquid into superposed layers. The lower layer is composed primarily of products of higher density and the upper layer is composed primarily of products of lower density. The products of the two layers may be readily removed separately from the tank.

The pulsation amplitude must be controlled to enable the heavy products to be conveniently removed as a function of the quantity of the products to be removed. Thus, the pulsation amplitude should be increased when the quantity of the heavy products is increased, i.e. the level of separation between the two layers rises, and to decrease the pulsation amplitude in the contrary case. It has accordingly been proposed to provide a sensor for detecting the level of separation of the two layers of the product to be separated, and to throttle the extent of the venting of the air from the air chamber in response to the sensed level. However, this has the disadvantage of providing permanent air venting during the entire operation while the compressed air is admitted to the air chamber although the momentary extent of venting varies. This produces poor operating conditions because the effect of the shock of the intermittent opening of the compressed air inlet is considerably attenuated by the venting. Also, such an arrangement cannot be used with large separating tanks wherein the product layers do not have uniform thickness.

To remedy this disadvantage, it has been proposed to divide the tank into two separate compartments and to associate a respective level sensor with each compartment. However, this "double tank" does not eliminate the first-mentioned disadvantage and, furthermore, does not offer the possibility of differently controlling the pulsation amplitude in the two compartments so that the two compartments may be considered as independent separation tanks. Therefore, this arrangement is inapplicable when the two compartments receive the compressed air from a single air inlet element.

It is the primary object of this invention to overcome the mentioned disadvantages of conventional separation tanks operating with pneumatically pulsated liquids.

To benefit fully from the shock effect of the intermittently delivered compressed air, the air is vented at a constant venting level only during a part of the time the compressed air is admitted, more precisely at the end of each air admission period.

Where a tank with two distinct compartments fed by a single compressed air inlet is used, an independent pulsation amplitude control according to the respective needs in the two compartments is assured.

According to one aspect of the invention, the above and other objects are accomplished with a method of controlling the pulsation amplitude of air delivered into a tank containing a liquid pneumatically pulsated to separate products of different density into two superposed layers, which comprises intermittently delivering the air through an air inlet element into the tank, programming the opening and closing of the air inlet element for the intermittent delivery of the air, storing the air inlet element opening and closing program in a memory unit generating a corresponding output signal, intermittently venting the air through a venting element, and detecting the level of separation of the two layers by a level sensor emitting a control signal corresponding to the sensed level. The beginning of the venting after the complete opening of the air inlet element, the termination of venting at the same time as the closing of the air inlet element and the duration of the venting are controlled by an output signal of a computer transmitted to the venting element. The computer has a first input receiving the control signal from the level sensor and a second input receiving the output signal from the memory unit.

According to another aspect of the present invention, a tank of the first described type comprises a memory unit storing the air inlet element opening and closing program and generating a corresponding output signal, a venting element for intermittenly venting the compressed air from the air chamber, a sensor for detecting the level of separation of the sensed level, and a computer for transmitting an output signal to the venting element for controlling the beginning of the venting after the complete opening of the air inlet element, the termination of venting at the same time as the closing of the air inlet element and the duration of the venting. The computer has a first input receiving the control signal from the level sensor and a second input receiving the output signal from the memory unit.

The venting element is preferably a solenoid valve, the air inlet element is preferably a throttle valve and, if a separate air exhaust element is provided, it also is preferably a throttle valve.

The above and other objects, advantages and features of this invention will become more apparent from the following detailed description of some now preferred embodiments thereof, taken in conjunction with the accompanying schematic drawing wherein FIG. 1 is a transverse section showing one embodiment of the separating tank of the invention;

Figure 1:
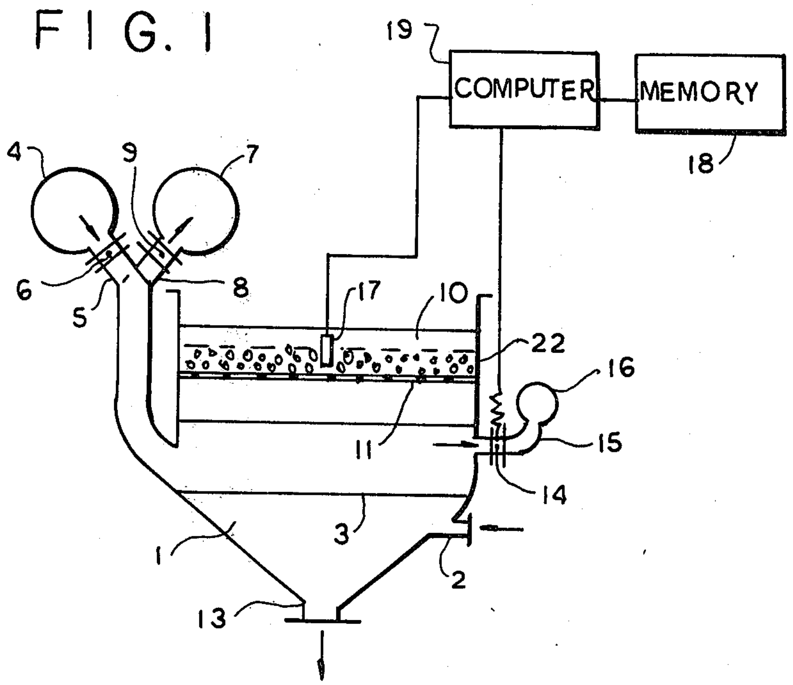

Referring now to the drawing wherein like reference numerals designate like parts operating in a like manner in all figures, FIG. 1 shows a separating tank for classifying a granular product into two superposed layers of products of different density through the action of a pulsating liquid to which a bed of the product is subjected. The illustrated tank comprises pulsation chamber 1 filled with liquid, such as water, separation chamber 10 and perforated bottom 11 for separation chamber 10 between chambers 1 and 10. The perforated bottom is immersed in the liquid and the pulsation and separating chambers are in communication through the perforated bottom. The liquid is supplied to pulsation chamber 1 through inlet conduit 2 and the liquid is subjected to pneumatically controlled pulsations in chamber 1 by the intermittent delivery of compressed air thereto. For this purpose, air chamber 3 is arranged across pulsation chamber 1 and this chamber is open at its lower part along its entire length so that air chamber 3 is in communication with pulsation chamber 1. Compressed air is delivered from source 4 through air delivery conduit 5 leading to air chamber 3, air inlet element 6 being mounted in conduit 5 for intermittently delivering the compressed air into the air chamber. The air inlet element used in the illustrated embodiment is a throttle valve suitably programmed to open and close cyclically for the desired intermittent delivery of the air into air chamber 3.

In the embodiment of FIG. 1, the cyclic escape of air from the air chamber is assured by separate air exhaust element 9, which is also a throttle valve, mounted in air exhaust conduit 8 leading to air expansion chamber 7. The opening and closing of valve 9 is synchronized with that of valve 6.

The air pulses produced by the cyclic opening and closing of throttle valves 6 and 9 are transmitted from air chamber 3 to the water in the tank and the correspondingly pulsating water acts on bed 12 of the granular product resting on perforated bottom 11 which is immersed in the water. Under the action of the pulsating water, the granular product of the lower layer having a higher density than the product of the upper layer. The product of the lower layer is removed from the tank by gravity through output conduit 13 at the lower end of the tank while the low-density product of the upper layer is removed, with the water, by flowing over the rim of the tank out of separation chamber 10.

All of this structure is known in separating tanks wherein air is delivered into the tank through a air inlet element and the opening and closing of the air inlet element is programmed for the intermittent delivery of the air. The control of the pulsation amplitude according to the present invention will now be described.

Venting element 14, which is a solenoid valve in the illustrated embodiment, is mounted in venting conduit 15 connecting air chamber 3 to air expansion chamber 16 for intermittently venting the compressed air from the air chamber. Memory unit 18 stores the air inlet element opening and closing program and generates a corresponding output signal. Sensor 17 is arranged to detect the level of separation of the two layers in bed 11 and emits a control signal corresponding to the sensed level. Computer 19 has a first input receiving the control signal from level sensor 17 and a second input receiving the output signal from memory unit 18.

In this manner, the beginning of the venting after the complete opening of air inlet element 6, the termination of venting at the same time as the closing of the air inlet element and the duration of venting is controlled by an output signal of computer 19 transmitted to solenoid valve 14. The beginning of venting, i.e. the opening of solenoid valve 14, is effected after throttle valve 6 has been opened completely and the termination of venting, i.e. the closing of solenoid valve 14, is effected at the same time as the closing of throttle valve 6, the duration of venting being determined by the control signal emitted by level sensor 17.

Figure 2:
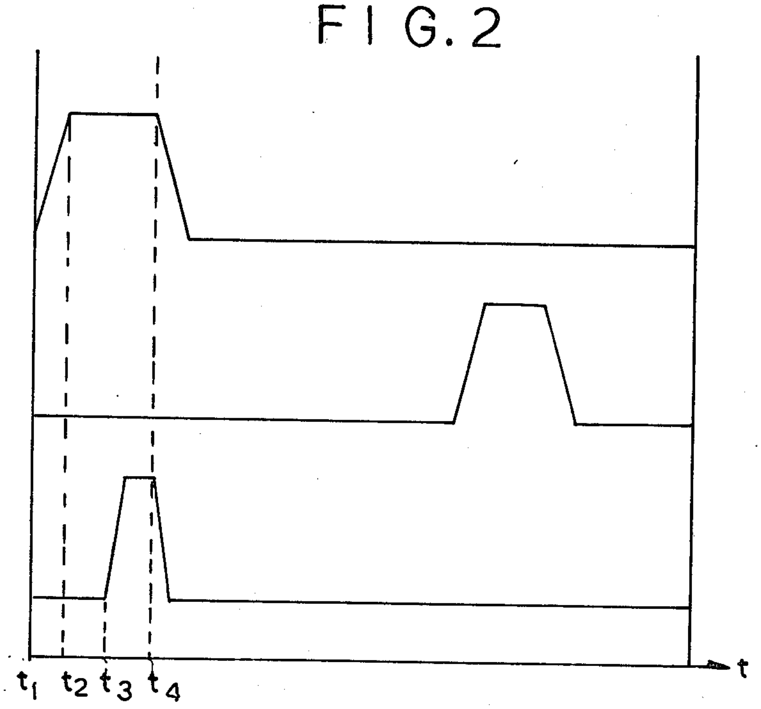
FIG. 2 is a diagram illustrating the operation of this tank.

This cycle of operations is illustrated in the diagram of FIG. 2. From top to bottom, the operations of throttle valve 6, throttle valve 9 and solenoid valve 14 are shown in the upper, middle and lower graphs. Opening of valve 6 is begun at time $t_1$ and completed at time $t_2$. Closure of the valve is effected at time $t_4$. Opening of solenoid valve 14 is effected at time $t_3$ which is later than time $t_2$ and earlier than time $t_4$ when the closing of valve 14 is effected at the same time as that of valve 6. Times $t_1$ and $t_4$ are fixed by the program stored in memory unit 18 while time $t_3$ varies with the control signal emitted by level sensor 17. At any rate, venting is effected solely during a part of the time ($t_4$-$t_2$) of the full admission of compressed air into air chamber 3, more particularly at the end of this time. It will be understood that air exhaust valve 9 is opened and closed after time $t_4$ before the next cycle of air admission controlled by the re-opening of throttle valve 6.

Figure 3:
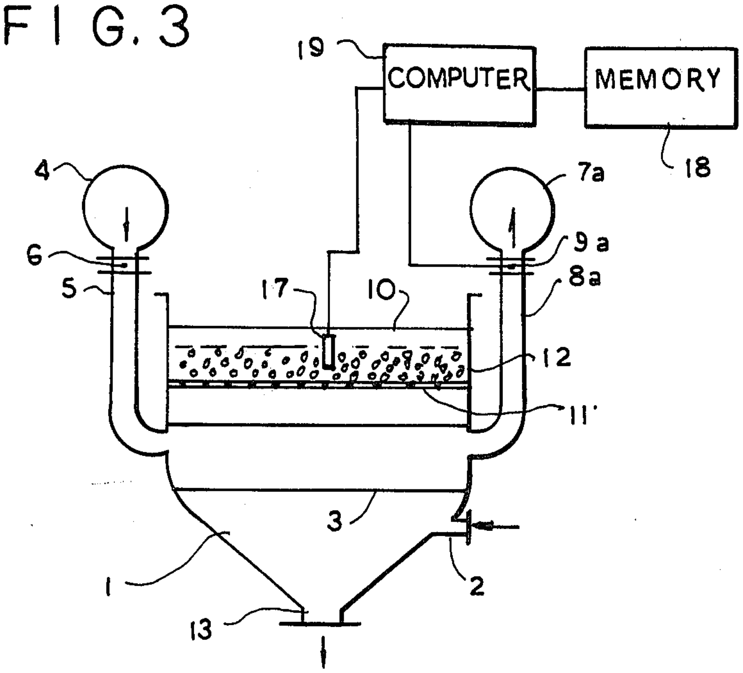
FIG. 3 is the same view as that of FIG. 1 of another embodiment.

Except for the minor exception to be noted, the embodiment of FIG. 3 is identical with that of FIG. 1 and the identical reference numerals used therein designate like parts operating in a like manner, wherefore the structure and equivalent operation will not be further described. However, as shown in the drawing, in this embodiment, no separate air exhaust element is provided but valve **9*a* arranged in conduit 8*a* leading to air expansion chamber 7*a*** serves as the venting element and constitutes the sole air exhaust element for the compressed air. The air inlet is mounted at one side of the tank and the air venting and exhaust is arranged at the opposite side.

Figure 4:
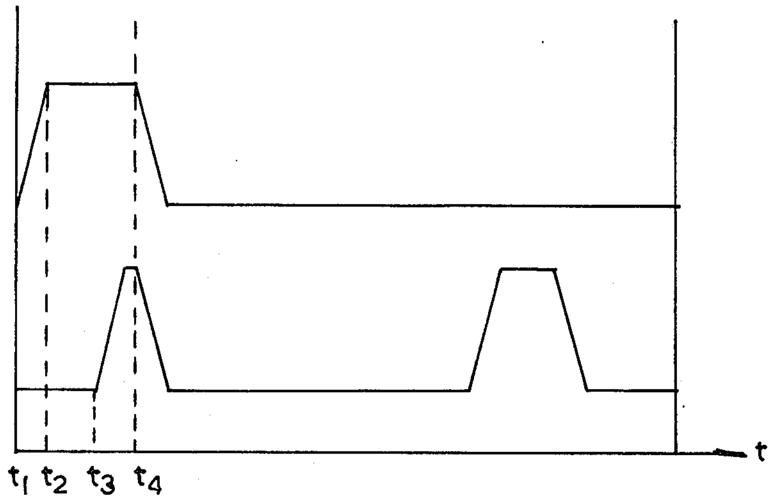
FIG. 4 is a diagram illustrating the operation of the embodiment of FIG. 3.

The diagram of FIG. 4 shows the operation of this embodiment, the opening and closing cycle of air inlet valve 6 being shown in the upper graph and that of venting and air exhaust valve 9 in the lower graph, the times $t_1$, $t_2$, $t_3$ and $t_4$ having the same significance as in FIG. 2. Since the valve 9 operates as venting and air escape element, it is opened again after time $t_4$ to permit the compressed air to escape from air chamber 3 before valve 6 is opened again for the next pulsating cycle.

Figure 5:
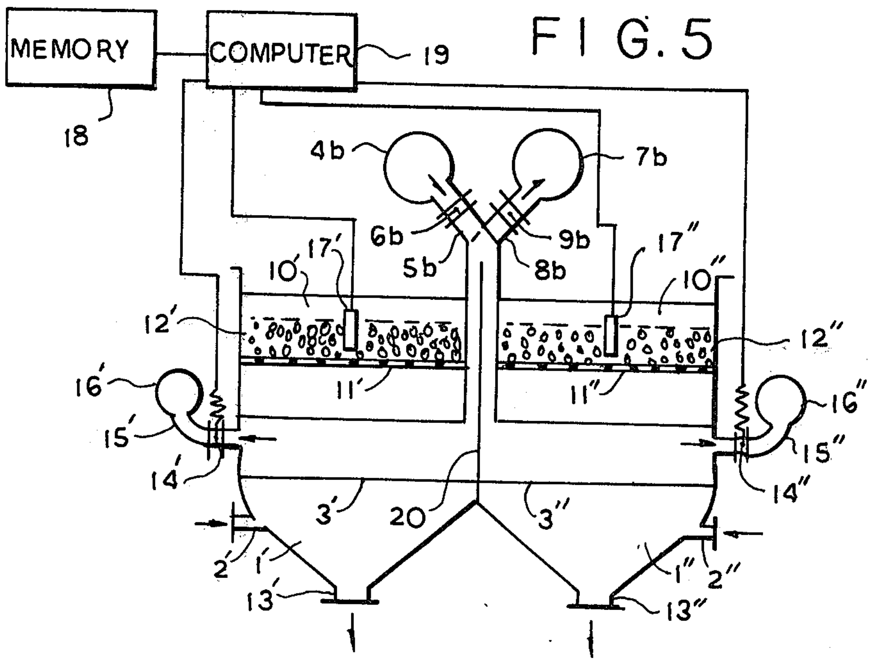
FIG. 5 shows yet another embodiment of the separating tank in the same view as that of FIG. 1.

FIG. 5 illustrates the pulsation amplitude control system of this invention applied to a "double" tank, i.e. a tank divided into two adjacent compartments by a dividing wall 20. Each compartment constitutes a separating tank analogous to the tank of FIG. 1 and the same reference numerals carrying primes and double-primes designate like structures operating in a like manner to avoid redundancy in the description. As shown, both compartments are served by a sole air delivery system **4*b*, 5*b*, 6*b* and air exhaust system 7*b*, 8*b*, 9*b* for generating cyclic pulses in the liquid contained in the two compartments. Each compartment has a respective pulsation chamber, perforated bottom and air chamber, with air inlet element 6*b* arranged to deliver the compressed air into both air chambers but a respective venting element 14′, 14″ for intermittently but independently venting the compressed air from each air chamber. A respective sensor 17′, 17″ detects the level of separation of the two layers in each compartment. The single computer 19 transmits a respective output signal to the venting elements and has two first inputs receiving the control signals from level sensors 17′, 17″** while the second input receives the output signal from memory unit 18. In this way, different pulsation amplitudes may be provided in the two compartments. This is particularly advantageous in the illustrated embodiment wherein a single compressed air inlet and exhaust is provided for both compartments because it would be impossible to achieve this result without independently controlled venting elements.

Figure 6:
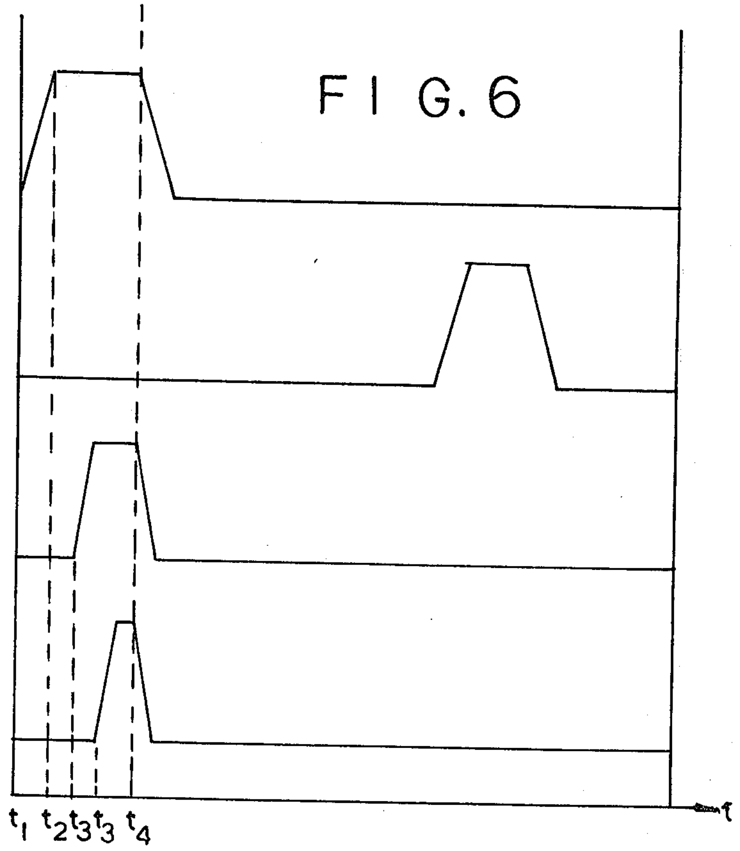
FIG. 6 is a diagram illustrating the operation of the embodiment of FIG. 5.

In the operating diagram of FIG. 6, the uppermost graph shows the opening and closing cycle of valve 6b, the next graph that of valve 9b, the next one that of solenoid valve 14' and the lowest graph that of solenoid valve 14". It differs from the operation shown in FIG. 2 only by the fact that two venting valves are provided and the opening of these valves is respective set for times $t'_3$ and $t''_3$, which variables are not necessarily the same and depend solely on the control signals transmitted by level sensors 17' and 17", which may differ.

Figure 7:
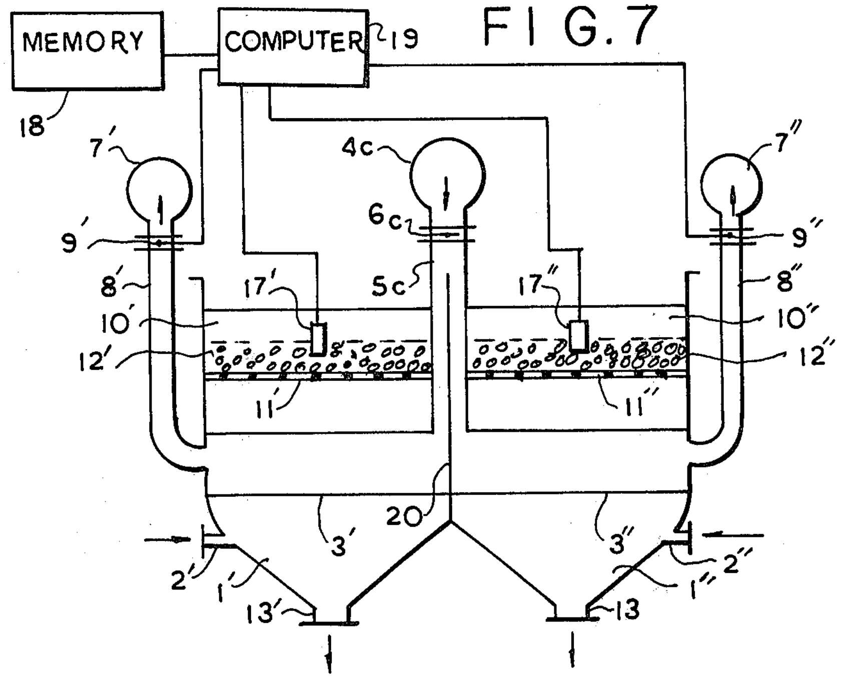
FIG. 7 shows a fourth embodiment in the same view as that of FIG. 1.
Figure 8:
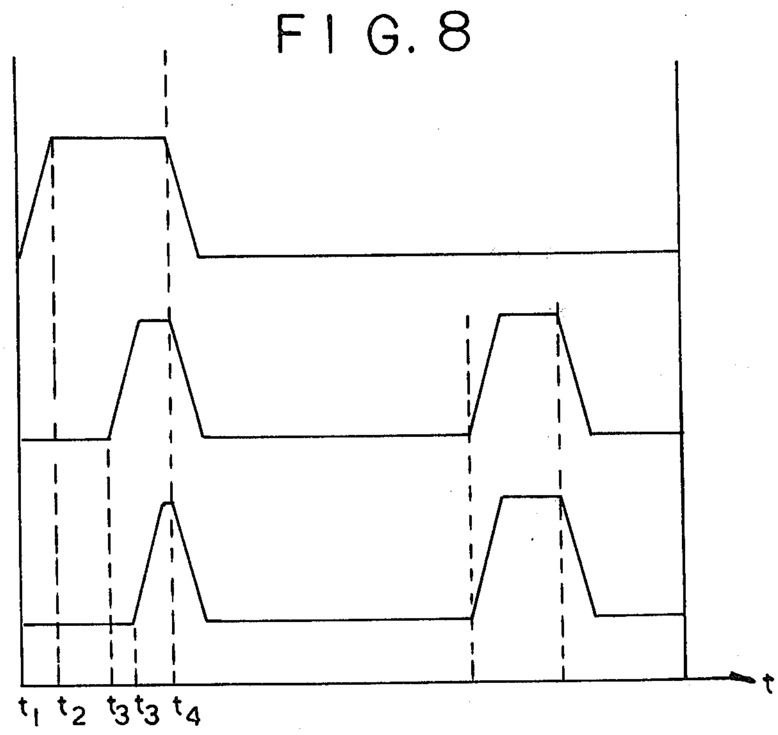
FIG. 8 is a diagram illustrating the operation of the fourth embodiment.

The embodiment of FIG. 7 differs from that of FIG. 5 only in that a separate air exhaust system is eliminated and, as in the embodiment of FIG. 3, the venting and exhaust systems are one and the same. The structure and operation of this embodiment are obvious from the above description of FIGS. 3 and 5, as clearly appears from the like reference numerals. The same holds for the operating diagram of FIG. 8 the uppermost graph of which illustrates the opening and closing cycle of valve 6c delivering compressed air from source 4c through conduit 5c into the air chambers of the two adjacent compartments, the center graph illustrating the operating cycle of valve 9' and the lowest graph showing the operating of valve 9". Since the latter valves serve as venting as well as exhaust elements, valves 9' and 9" are opened sequentially at times $t'_3$ and $t''_3$ which, as indicated in connection with FIG. 6, may be variable and are not necessarily the same.

Whatever embodiment of separating tank is used, the tank or tank compartment may be longitudinally subdivided into a plurality of cells. Each cell or pair of cells in case of a compartmentalized tank is then provided with a control system according to the invention.

With all embodiments, it is essential to avoid an air deficit in the air chamber, which would occur if the amount of vented air would create a total air exhaust exceeding the delivery of air into the air chamber. This would disturb the proper operation of the separating tank. This may be conveniently avoided by controlling the duration of the air exhaust or by providing a check valve in the exhaust system. At any rate, the duration of the opening of the venting element will depend solely on the control signal corresponding to the level of separation between the two layers of granular products so that the pulsation intensity will be reduced in direct proportion to the reduction of the quantity of the heavy product or, more precisely, when it falls below a reference valve.

While the invention has been described with respect to some now preferred specific embodiments, it will be understood that many modifications and variations may occur to those skilled in the art without departing from the spirit and scope of this invention as defined in the appended claims.

What is claimed is:

1. A method of controlling the pulsation amplitude of air delivered into a tank containing a liquid pneumatically pulsated to separate products of different density into two superposed layers, which comprises the steps of (a) intermittently delivering the air through an air inlet element into the tank, (b) programming the opening and closing of the air inlet element for the intermittent delivery of the air, (c) storing the air inlet element opening and closing program in a memory unit generating a corresponding output signal, (d) intermittently venting the air through a venting element, (e) detecting the level of separation of the two layers by a level sensor emitting a control signal corresponding to the sensed level, and (f) controlling the beginning of the venting after the complete opening of the air inlet element, the termination of venting at the same time as the closing of the air inlet element and the duration of the venting by an output signal of a computer transmitted to the venting element, the computer having a first input receiving the control signal from the level sensor and a second input receiving the output signal from the memory unit.

2. A tank containing a liquid pneumatically pulsated by air delivered into the tank to separate products of different density into two superposed layers, which comprises (a) pulsation chamber filled with the liquid, (b) a separation chamber, (c) a perforated bottom for the separation chamber between the chambers and immersed in the liquid, the pulsation and separating chambers being in communication through the perforated bottom, (d) an air chamber in communication with the pulsation chamber, (e) an air inlet element for intermittently delivering compressed air into the air chamber, (1) opening and closing of the air inlet element for the intermittent delivery of the compressed air being Programmed, (f) a memory unit storing the air inlet element opening and closing program and generating a corresponding output signal, (g) a venting element for intermittently venting the compressed air from the air chamber, (h) a sensor for detecting the level of separation of the two layers, (1) the sensor emitting a control signal corresponding to the sensed level, and (i) a computer for transmitting an output signal to the venting element for controlling the beginning of the venting after the complete opening of the air inlet element, the termination of venting at the same time as the closing of the air inlet element and the duration of the venting, (1) the computer having a first input receiving the control signal from the level sensor and a second input receiving the output signal from the memory unit.

3. The separating tank of claim 2, wherein the venting element constitutes the sole air exhaust element for the compressed air.

4. The separating tank of claim 2, further comprising a separate air exhaust element.

5. The separating tank of claim 2 and divided into two adjacent compartments each having a respective pulsation chamber, perforated bottom and air chamber, the air inlet element being arranged for delivering the compressed air into both air chambers, a respective one of the venting elements for intermittently venting the compressed air from each air chamber, a respective one of the level sensors for detecting the level of separation of the two layers in each compartment, and the computer transmitting a respective output signal to the venting elements and having two first inputs receiving the control signals from the level sensors.

6. The separating tank of claim 5, further comprising a separate air exhaust element connected to both air chambers.

7. The separating tank of claim 5, further comprising respective air exhaust elements connected to each air chamber.

8. The separating tank of claim 5, wherein the venting elements constitute the sole air exhaust elements for the compressed air.

* * * * *